US010565178B1

(12) United States Patent
Rajagopal

(10) Patent No.: US 10,565,178 B1
(45) Date of Patent: Feb. 18, 2020

(54) EFFICIENT STORAGE AND RETRIEVAL OF XML DATA

(71) Applicant: FAIR ISAAC CORPORATION, San Jose, CA (US)

(72) Inventor: Hari Ohm Prasath Rajagopal, San Jose, CA (US)

(73) Assignee: Fair Isaac Corporation, San Jose, CA (US)

(*) Notice: Subject to any disclaimer, the term of this patent is extended or adjusted under 35 U.S.C. 154(b) by 584 days.

(21) Appl. No.: 14/644,763

(22) Filed: Mar. 11, 2015

(51) Int. Cl.
*G06F 17/30* (2006.01)
*G06F 16/22* (2019.01)
*G06F 17/22* (2006.01)
*G06F 16/93* (2019.01)
*G06F 16/958* (2019.01)

(52) U.S. Cl.
CPC .......... *G06F 16/2282* (2019.01); *G06F 16/93* (2019.01); *G06F 16/986* (2019.01); *G06F 17/2247* (2013.01)

(58) Field of Classification Search
CPC ................ G06F 17/30339; G06F 7/00; G06F 17/30595; G06F 16/2282; G06T 13/00
See application file for complete search history.

(56) References Cited

U.S. PATENT DOCUMENTS

| | | | | |
|---|---|---|---|---|
| 7,523,086 B1* | 4/2009 | Teague | ................ | H04L 41/0853 |
| 7,644,066 B2* | 1/2010 | Krishnaprasad | ........ | G06F 16/81 |
| | | | | 707/999.003 |
| 7,941,395 B2* | 5/2011 | Cassidy | ............ | G06F 17/30917 |
| | | | | 707/600 |
| 8,136,724 B1* | 3/2012 | Aidasani | ............ | G06Q 20/3223 |
| | | | | 235/379 |
| 8,212,821 B1* | 7/2012 | Kopylov | ................. | G06T 13/80 |
| | | | | 345/418 |
| 8,843,997 B1* | 9/2014 | Hare | ................... | H04L 63/0281 |
| | | | | 709/200 |
| 2002/0078068 A1* | 6/2002 | Krishnaprasad | ...... | G06F 16/284 |
| 2002/0123993 A1* | 9/2002 | Chau | ....................... | G06F 16/86 |
| 2003/0037069 A1* | 2/2003 | Davison | ............ | G06F 17/30893 |
| 2003/0060973 A1* | 3/2003 | Mathews | ............... | G01C 21/26 |
| | | | | 701/410 |
| 2004/0103105 A1* | 5/2004 | Lindblad | ................. | G06F 16/93 |

(Continued)

*Primary Examiner* — Usmaan Saeed
*Assistant Examiner* — David M Nafziger
(74) *Attorney, Agent, or Firm* — Mintz Levin Cohn Ferris Glovsky and Popeo, P.C.

(57) ABSTRACT

A computing server can receive, from a computing device, an extensible markup language document and a location path pointing to an identifier uniquely identifying the extensible markup language document. The computing server can rearrange data within the extensible markup language document to generate a table including data arranged according to one or more location paths indicated by the extensible markup language document. Each location path of the one or more location paths can point to a storage location for data listed under the location path. The table can be specific to the identifier uniquely identifying the extensible markup language document. The computing server can store the table in a data store connected to the computing server. The computing server can retrieve, when required, the stored data from the data store within a time independent of a total number of XML documents in the data store.

20 Claims, 14 Drawing Sheets

(56) References Cited

U.S. PATENT DOCUMENTS

| | | | |
|---|---|---|---|
| 2005/0055355 A1* | 3/2005 | Murthy | G06F 17/30914 |
| 2005/0165784 A1* | 7/2005 | Gomez | G06F 17/30879 |
| 2005/0203957 A1* | 9/2005 | Wang | G06F 16/86 |
| 2005/0228786 A1* | 10/2005 | Murthy | G06F 16/81 |
| 2006/0155726 A1* | 7/2006 | Krasun | G06F 16/81 |
| 2007/0179996 A1* | 8/2007 | Azami | G06F 16/81 |
| 2008/0120321 A1* | 5/2008 | Liu | G06F 16/86 |
| 2009/0157722 A1* | 6/2009 | Liu | G06F 17/30932 |
| 2010/0250551 A1* | 9/2010 | Kamimura | G06F 16/81 707/741 |
| 2011/0289118 A1* | 11/2011 | Chen | G06F 16/81 707/803 |
| 2014/0351686 A1* | 11/2014 | Yawn | G06F 17/248 715/230 |
| 2015/0026189 A1* | 1/2015 | Li | G06F 16/2228 707/741 |
| 2015/0074299 A1* | 3/2015 | Maniwa | G06F 3/06 710/74 |
| 2015/0301823 A1* | 10/2015 | Hatakeyama | G06F 8/71 717/173 |
| 2016/0117286 A1* | 4/2016 | Dettman | G06F 16/254 715/256 |
| 2017/0249246 A1* | 8/2017 | Bryant | G06F 12/0261 |

\* cited by examiner

| LOCATION PATH 406 | DATA 404 |
|---|---|
| /a/b | ABC |
| /a/b | BCD |
| /a/c | ABC |
| /a/id | 89011 |

| Type of Location Path 504 | Data or Value 506 |
|---|---|
| Location Path 508 | List<String> |
| ANY 510 | List<String> |

/a/b 508 | ANY 510
ABC | ABC
BCD | BCD

| 89011 | a/b | a/c | a/d | ANY |
|---|---|---|---|---|
| | ABC BCD | ABC | 89011 | ABC BCD 89011 |В
| | 508 | 508 | 508 | 510 |

1002

EFFICIENT STORAGE AND RETRIEVAL OF XML DATA

TECHNICAL FIELD

The subject matter described herein relates to a computing server that can efficiently store data of an Extensible Markup Language (XML) document in a data store, and retrieve, when required, the stored data from the data store within a time independent of a total number of XML documents in the data store.

BACKGROUND

Organizations often use Extensible Markup Language (XML) for exchanging structured data between applications. XML data is typically stored in relational databases. However, the traditional searching of data within XML data stored in the relational databases is very slow. Moreover, this XML data requires constant monitoring by adding a new index every time performance degrades. Additionally, when the amount of XML data stored in the relational database exceeds a threshold (for example, 100,000 documents), the time taken by a search query to retrieve search results becomes undesirably high.

SUMMARY

The current subject matter describes a computing server that can efficiently store data of an Extensible Markup Language (XML) document in a data store, and retrieve, when required, the stored data from the data store within a time independent of a total number of XML documents in the data store.

In one aspect, a computing server comprising at least one programmable processor can receive, from a computing device connected to the computing server, an extensible markup language document and a location path pointing to an identifier uniquely identifying the extensible markup language document. The computing server can generate, by rearranging data within the extensible markup language document, a table comprising data arranged according to one or more location paths indicated by the extensible markup language document. Each location path of the one or more location paths pointing to a storage location for data listed under the location path. The table can be specific to the identifier uniquely identifying the extensible markup language document. The computing server can store the table in a data store connected to the computing server.

In some variations, one or more of the following can be implemented either individually or in any suitable or feasible combination. The table can further include data arranged according to another location path that can represent a combination of all of the one or more location paths indicated by the extensible markup language document. The data can be arranged according to this another location path including data pointed to by each of the one or more location paths.

The computing server can receive, from the computing device, a search query including a location path and the identifier. The computing server can search the table in the data store for a data associated with the location path and the identifier specified in the search query. The computing server can send the searched data associated with the location path and the identifier specified in the search query to the computing device. The computing device can be configured to display the searched data on a graphical user interface. The receiving of the extensible markup language document and the location path, the generating of the table, and the storing of the table can occur in design-time. The receiving of the search query, the searching of the table, and the sending of the searched data can occur in real-time.

The computing server can receive, from the computing device, a search query including data stored in the table in the data store. The computing server can search the table in the data store for the identifier associated with the data stored in the table in the data store. The computing server can send the identifier to the computing device. The computing device can be configured to display the searched identifier on a graphical user interface. The receiving of the extensible markup language document and the location path, the generating of the table, and the storing of the table can occur in design-time. The receiving of the search query, the searching of the table, and the sending of the searched data can occur in real-time.

The computing device can be connected to the computing server via a communication network. The data store can be connected to the computing server via a communication network.

In another aspect, a system is described that can include a computing device, a server operatively coupled to the computing device, and a data store operatively coupled to the server. The computing device can have (for example, store and/or transmit) an extensible markup language document and a location path pointing to an identifier uniquely identifying the extensible markup language document. The computing server can include at least one programmable processor configured to receive the extensible markup language document and the location path from the computing device. The computing server can be configured to generate, by rearranging data within the extensible markup language document, a table comprising data arranged according to one or more location paths indicated by the extensible markup language document. Each location path of the one or more location paths can point to a storage location for data listed under the location path. The table can be specific to the identifier uniquely identifying the extensible markup language document. The data store can be operatively coupled to the computing server. The data store can be configured to store the table.

In some variations, one or more of the following can be implemented either individually or in any suitable or feasible combination. The computing server can be further configured to: receive, from the computing device, a search query including a location path and the identifier; search the table in the data store for a data associated with the location path and the identifier specified in the search query; and send the searched data associated with the location path and the identifier specified in the search query to the computing device. The computing device can execute (for example, implement) a graphical user interface configured to display the searched data. The receiving of the extensible markup language document and the location path, the generating of the table, and the storing of the table can occur in design-time. The receiving of the search query, the searching of the table, and the sending of the searched data can occur in real-time.

The computing server can be further configured to: receive, from the computing device, a search query including data stored in the table in the data store; search the table in the data store for the identifier associated with the data stored in the table in the data store; and send the identifier to the computing device. The computing device can include a user interface device that is configured to display the searched identifier. The receiving of the extensible markup language document and the location path, the generating of the table, and the storing of the table can occur in design-time. The receiving of the search query, the searching of the table, and the sending of the searched data can occur in real-time.

The computing device can be operatively coupled to the computing server via a communication network. The data store can be operatively coupled to the computing server via a communication network.

In yet another aspect, a non-transitory computer program product is described that can store instructions that, when executed by at least one programmable processor, can cause the at least one programmable processor to perform operations comprising: receiving an extensible markup language document and a location path pointing to an identifier uniquely identifying the extensible markup language document; and generating, by rearranging data within the extensible markup language document, a table comprising data arranged according to one or more location paths indicated by the extensible markup language document, each location path of the one or more location paths pointing to a storage location for data listed under the location path, the table being specific to the identifier uniquely identifying the extensible markup language document; and storing the table in a data store.

In some variations, one or more of the following can be implemented either individually or in any suitable or feasible combination. The operations can further include: receiving a first search query including a location path and the identifier; searching the table in the data store for a data associated with the location path and the identifier specified in the search query; and sending the searched data associated with the location path and the identifier specified in the search query.

The operations can further include: receiving a second search query including data stored in the table in the data store; searching the table in the data store for the identifier associated with the data stored in the table in the data store; and sending the identifier.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The subject matter described herein provides many advantages. For example, the time taken to retrieve search results from a data store storing XML data is independent of a total number of XML documents stored in the data store. This time is significantly less than that required by conventional searches.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 illustrates an XML path table;

FIG. 5 illustrates a structure of the XML path index table;

FIG. 9 illustrates another subsequent version of the path index table;

FIG. 10 illustrates a final version of the path index table;

Like reference symbols in the various drawings indicate like elements.

DETAILED DESCRIPTION

Figure 1:
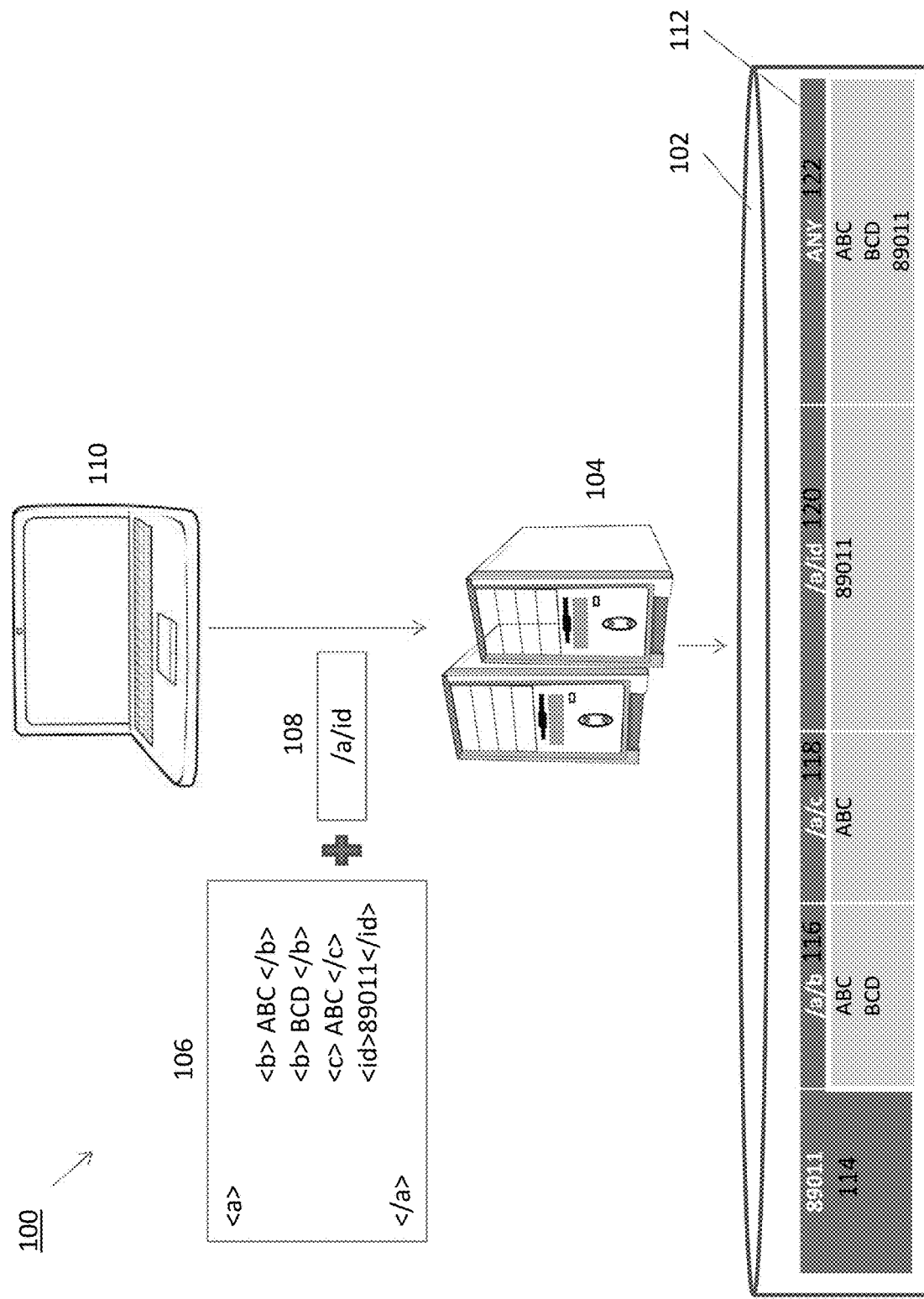
FIG. 1 illustrates a system 100 for efficiently storing data of an Extensible Markup Language (XML) document in a data store.

FIG. 1 illustrates a system 100 for efficiently storing data of an Extensible Markup Language (XML) document in a data store 102. The data store 102 described herein can also be referred to as a key value data store, which typically stores keys (also referred to as location paths herein) and associated values. A computing server 104 can receive an XML document 106, and a unique path 108 uniquely identifying the XML document 106 from a computing device 110 that can be operated by a user. The computing server can use the XML document 106 and the unique path 108 to generate a table 112 in the data store. This generation of the table 112 by using the XML document 106 and the unique path 108 is described in more detail by FIG. 2, which is discussed below in further detail. The generation of the table 112 is described with the help of an exemplary flowchart, as shown by FIG. 3, and exemplary tables shown by FIGS. 4-10, which are discussed below in further detail. The table 112 can store data in a specific structured manner, as shown, that can allow a fast search of data in the data store. The searching of data stored in the table 112 is described in more detail by FIGS. 11-14, which are also discussed below in more detail.

The data store 102 can be a relational database. The relational database can also be referred to as an XML data store. The computer server 104 can include at least one programmable processor, which can generate the table 112 by using the XML document 106 and the unique path 108. The computing device 110 can be one or more of: a laptop computer, a desktop computer, a tablet computer, a cellular smart phone, a phablet, a kiosk computing system, and/or any other computing device. The computing device 110 can be connected with the computing server 104 via a communication network, which can be one or more of: a local area network, a wide area network, internet, intranet, Bluetooth network, infrared network, and other communication networks.

In one implementation, the data store 102 can be a part of (for example, embedded within) the computing server 104. In an alternate implementation, the data store 102 and the computing server 104 can be external to each other. As per one example, the data store 102 can be connected to the computing server 104 via a communication network, which can be one or more of: a local area network, a wide area network, internet, intranet, Bluetooth network, infrared network, and other communication networks.

The XML document 106 can characterize an XML tree having a root node (for example, "a," as shown) and child nodes (for example, "b", "c", and "id"). Each node can have one or more values of data. For example, node "b" has values "ABC" and "BCD;" node "c" has a value "ABC;" and node "id" has a value "89011." Although the XML document 106 for tree representing nodes "a", "b", "c", and "id" is shown, in other implementations, the XML document 106 can represent an XML code characterizing other nodes of other one or more XML trees.

The node "id" can characterize a unique path identifier (for example, "89011"), which can uniquely identify the XML document. The unique path 108 can represent a path for the node "id." In some implementations, the unique path identifier described herein can also refer to as a row identifier.

The table 112 can include: a unique path identifier 114 uniquely identifying the XML document 106, XML data (for example, "ABC", "BCD", and "89011," which can also be referred to as values) stored according to XML location paths (also referred to as location paths, XPaths, or keys that are associated with corresponding values) 116, 118, and 120 (for example, "/a/b" 116, "/a/c" 118, and "/a/id" 120), and an ANY location path 122 (also referred to as ANY key), data associated with which includes all the data stored under all the location paths 116, 118, and 120. The ANY location path 122 can also be referred to as an all-inclusive location path that can incorporate all other location paths 116, 118, and 120. The arrangement of XML data according to location paths 116, 118, and 120 can allow the computing server 104 to quickly search for stored XML data when the search is performed based on unique path identifier 114 and location path as inputs, as described in more detail below by FIGS. 11 and 12. The column associated with the ANY location path 122 can advantageously allow the computing server 104 to quickly search for the unique path identifier 114 when the search is performed based on XML data (for example, "ABC" or "BCD") specified by the search query, as discussed in further detail below by FIGS. 13 and 14.

Figure 2:
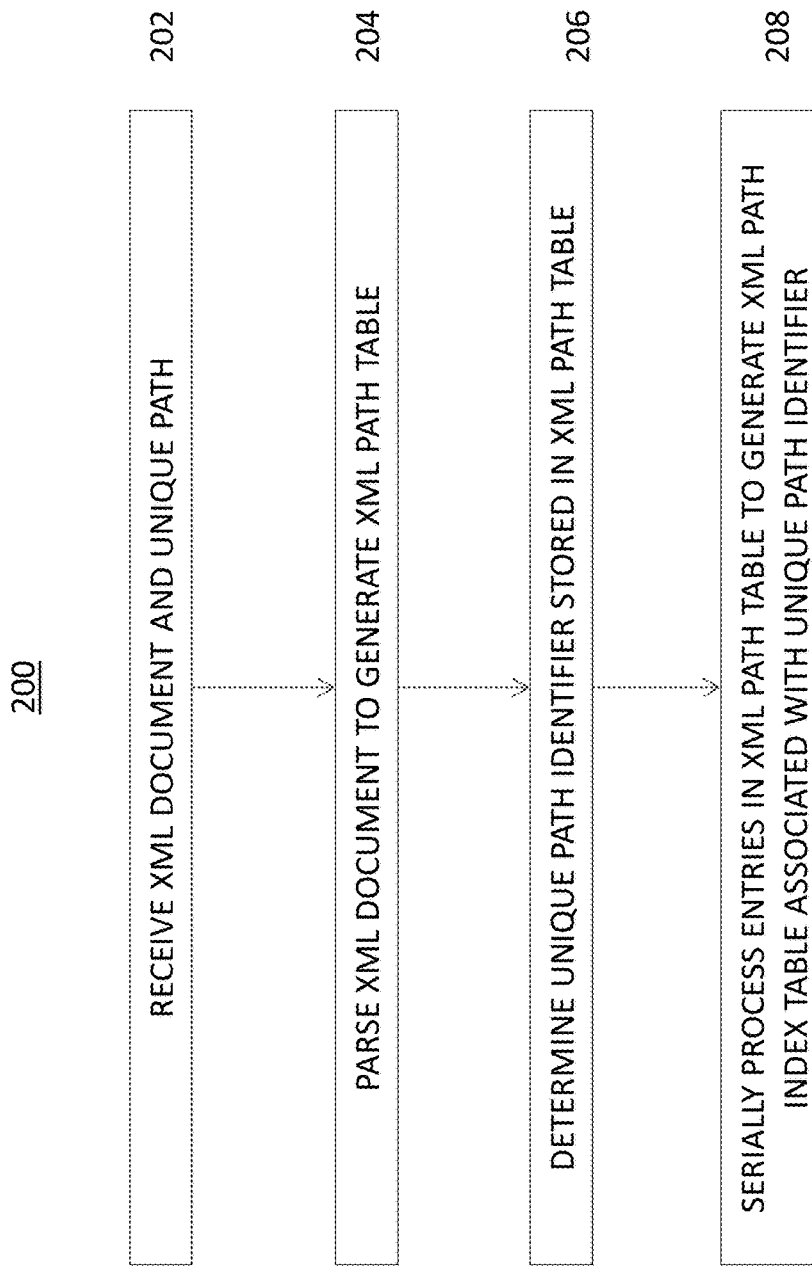
FIG. 2 illustrates a technical process for generating a table in the data store by using the XML document and the unique path.
Figure 3:
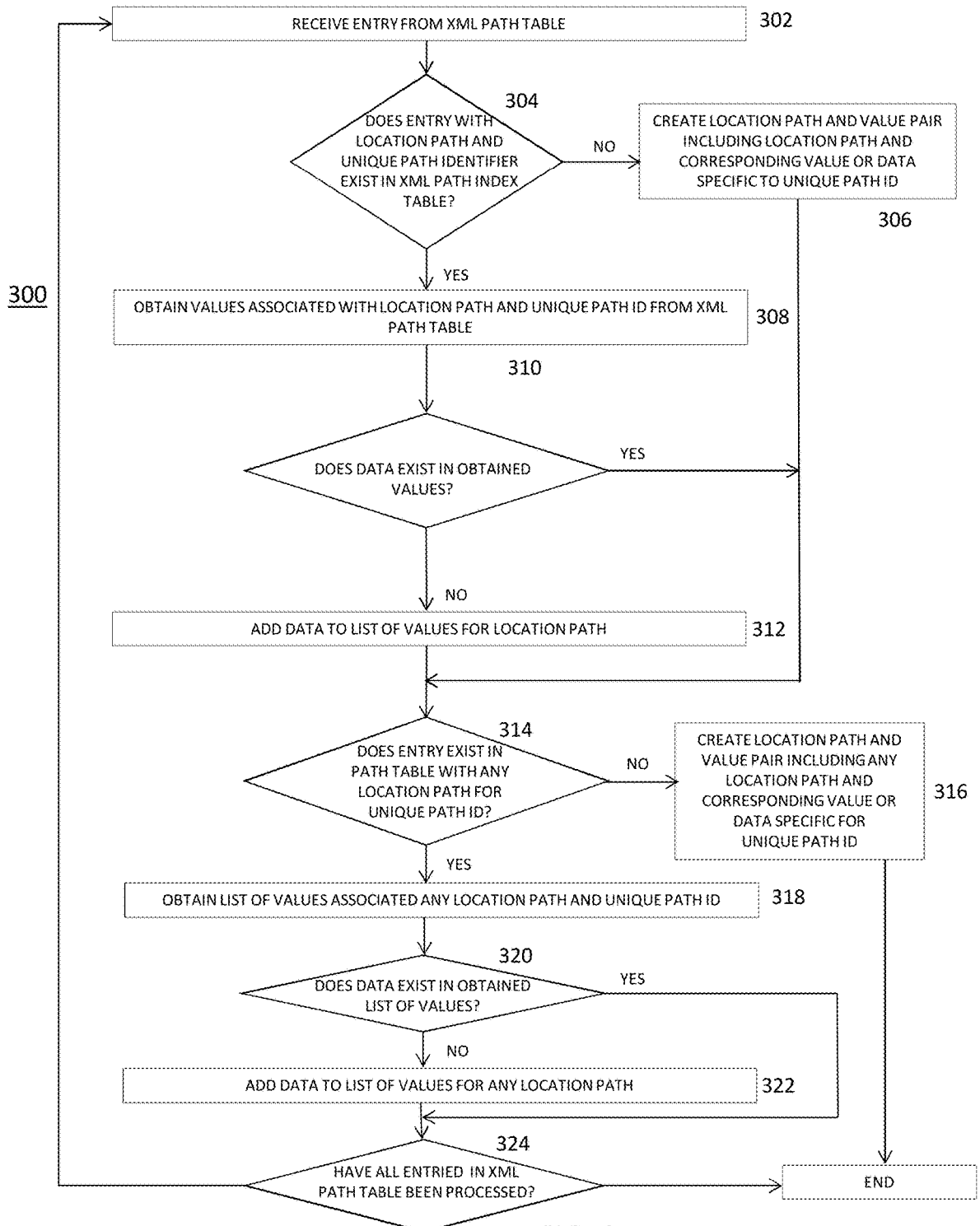
FIG. 3 illustrates a technical process for serial processing of all the entries in the XML path table to generate a final version of the XML path index table.

FIG. 2 illustrates a technical process 200 for generating a table 112 in the data store 102 by using the XML document 106 and the unique path 108. The computing server 104 can receive, at 202, an XML document 106 and a unique path 108 that uniquely identifies the XML document 106 from the computing device 110. The computing server 104 can parse, at 204, the XML document 106 to generate an XML path table 402, as shown by FIG. 4, which is an in-memory table. The parsing of the XML document 106 can include finding all possible location paths in the XML document 106 and XML values associated with them. The computing server 104 can determine, at 206, the unique path identifier (for example, "89011") stored within the XML path table 402. In some implementations, the XML path table 402 described herein can also be referred to as at least one of an XML table or an XML index table stored within a data store. The computing server 104 can serially process, at 208, all entries in the XML path table 402 to generate the table 112, which is also referred to as a final version of XML path index table 112. This serial processing of all the entries in the XML path table 402 to generate the final version of the XML path index table 112 is described in further detail by FIG. 3.

FIG. 3 illustrates a technical process 300 for serial processing of all the entries in the XML path table 402 to generate a final version of the XML path index table 112. The computing server 104 can receive, at 302, an entry from the XML path table 402.

The computing server 104 can determine, at 304, whether the entry exists in the current version of the XML path index table 112, which may initially be an empty data structure and is subsequently filled up with data. The entry can be each row in the XML path table 402, as shown in FIG. 4. Considering the first row, the entry can be location path "/a/b" and data "ABC." The computing server 104 can thus determine whether this entry exists with unique path identifier "89011" and location path "/a/b" in the current version of the path index table 112.

Figure 6:
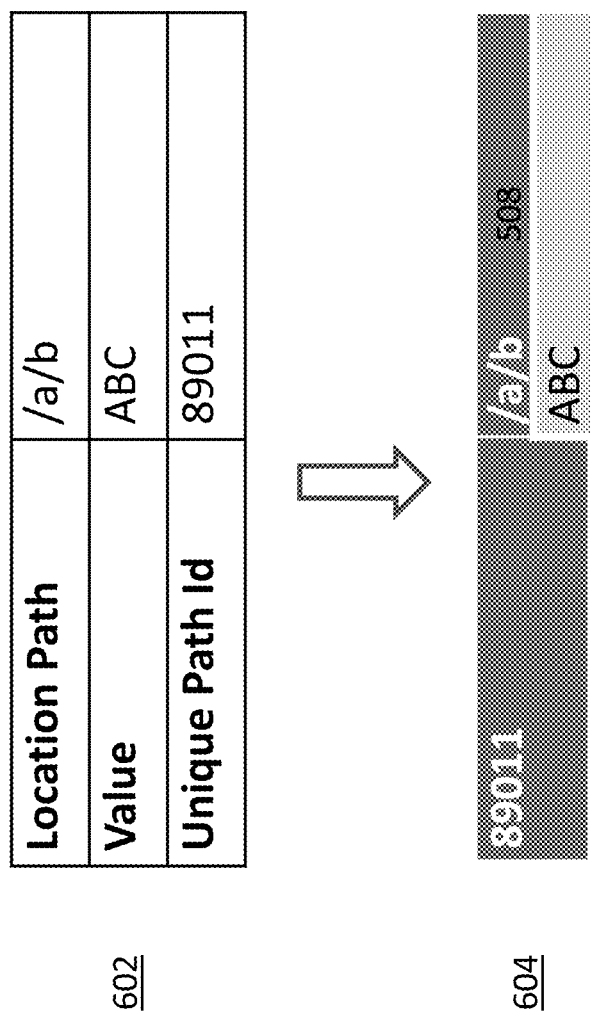
FIG. 6 illustrates a location path and value pair for a particular unique path identifier, and an initial version of the path index table.

If the computing server 104 determines at 304 that the entry does not exist in the XML path index table 112, the computing server 104 can create, at 306, a location path and value pair 602 for the unique path identifier, as shown by FIG. 6. The location path and value pair 602 can include a location path (for example, "/a/b") and a value in the row (for example, "ABC"), as shown in FIG. 6. The computing server 104 can add this location path and value pair to the current version of the XML path index table to update the XML path index table to obtain an updated XML path index table 604, as also shown by FIG. 6.

If the computing server 104 determines at 304 that the entry exists in the XML path index table 112, the computing server 104 can retrieve, at 308, the list of values of the location path (for example, location path "/a/b") and the unique path identifier (for example, "89011") from the path index table 604. In this case, the retrieved list of values of location path "/a/b" includes "ABC."

Figure 7:
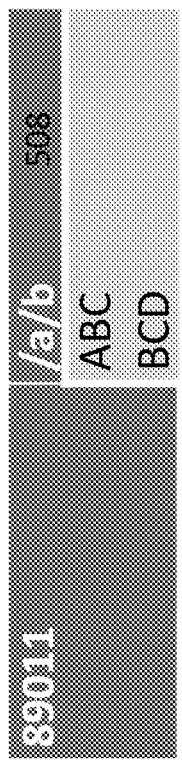
FIG. 7 illustrates a subsequent version of path index data table.

The computing server 104 can determine, at 310, whether entry data ("ABC" in this example) stored in the in-memory data store exists in the retrieved list of values ("ABC" in this example). Although, in this example, the entry data exists in the list of values, in cases where the entry data does not exist in the list of values, the computing server 104 can add, at 312, the entry data to the list of values, and update the list of values associated with the location path within the current version of the path index data table 112 for the unique path identifier. One example of the current version of the path index data table 112 after the addition at 312 can be table 702, as shown by FIG. 7.

The computing server 104 can determine, at 314, whether entry exists in path table with ANY location path and the unique path identifier (for example, "89011").

Figure 8:
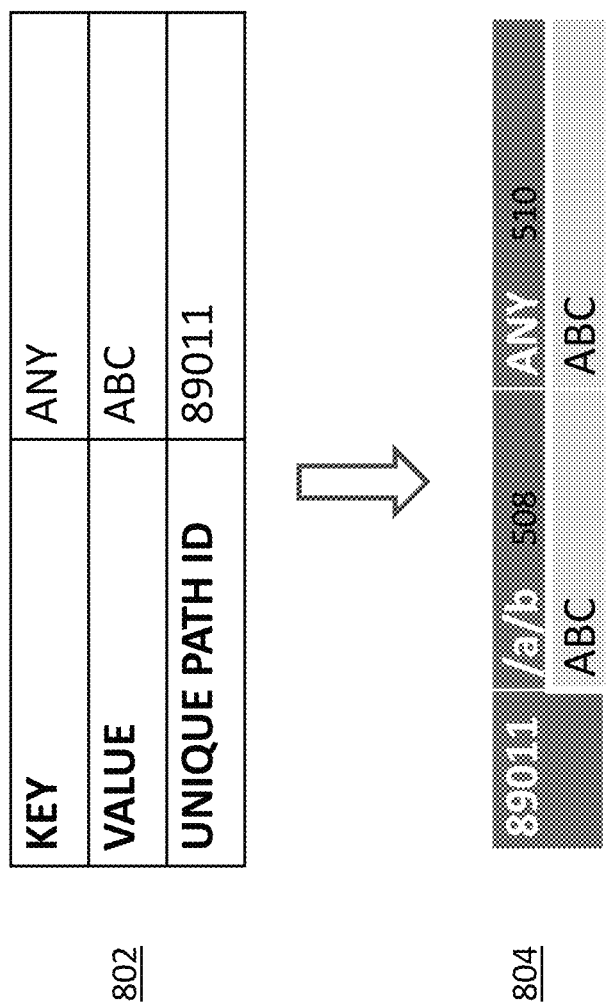
FIG. 8 illustrates a location path and value pair for ANY location path and a subsequent version of the path index table.

If the computing server 104 determines at 314 that the entry does not exist, the computing server 104 can create, at 316, a location path and value pair for the the unique path identifier. The location path and value pair can have ANY location path (that is, all the location paths specified in the XML path table 402) and corresponding value or data specified by all the location paths. For example, FIG. 8 shows a location path and value pair 802 for location path being ANY, value or data being "ABC," and the unique path identifier being "89011."

If the computing server 104 determines at 314 that the entry exists, the computing server 104 can obtain, at 318, a list of values associated with location path being ANY and with a unique path identifier. In the example discussed above, the list of values can be "ABC."

The computing server 104 can determine, at 320, whether data stored in the in-memory data store exists in the obtained list of values. In the above-described example, the data indicated in the search query is "ABC" and value associated with the ANY location path includes "ABC."

Figure 9:
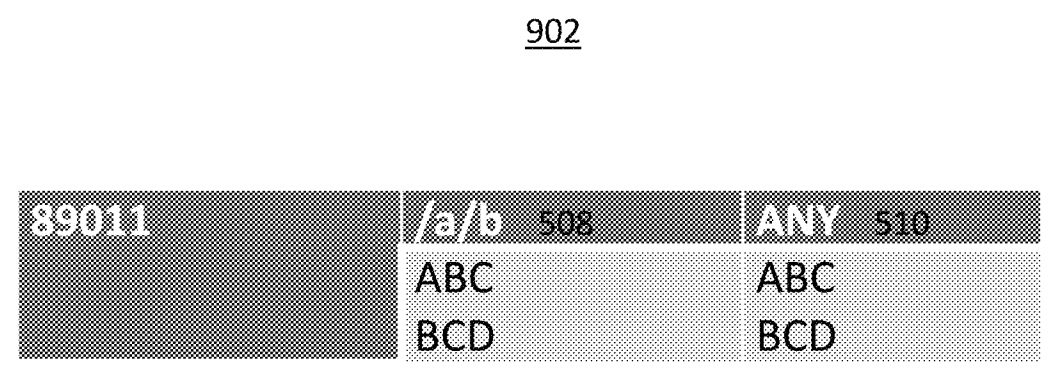

If the computing server 104 determines at 320 that the data indicated in the search query does not exist in the obtained list of values (as in an example other than the above-noted example with "ABC" existing in both data and value associated with ANY location path), the computing server 104 can add the data indicated in the search query to the list of values, and update this value list associated with ANY location path inside the path index table 112. For example, in the second row in the XML path table 402 where data is "BCD" and value list includes only "ABC," the data "BCD" doesn't exist in the value list. Accordingly, the computing server 104 can update the value list with this data "BCD." After the second row has been processed, the current version of the path index table 112 can be table 902, as shown by FIG. 9.

The computing server 104 can determine, at 324, whether all entries have been in the XML path table 402 have been processed. If the computing server determines at 324 that there is at least one entry that has not been processed, the control passes back to 302, and the computing server again receives an unprocessed entry at 302. If the computing server determines at 324 that all the entries have been processed, the process 300 stops ends. Once all the entries in the XML path table 402 have been processed, the computing server can generate a final version of the path index table 112, which is shown by table 1002, as shown by FIG. 10. It may be noted that table 1002 is same as the table 112 shown in FIG. 1.

FIG. 4 illustrates an XML path table 402, which is an in-memory table. The XML path table 402 includes data 404 associated with each location path 406, which characterizes a storage location of corresponding data 404 in the XML tree. The XML path table 402 can be stored in an in-memory table, and may not be stored in a database. The computing server 104 can determine the data 404 and corresponding location path 406 by parsing the XML document 106. The computing server 104 can serially process all entries in the XML path table 402 to generate the XML path index table 112, as described above.

FIG. 5 illustrates a structure 502 of the XML path index table 112. The structure includes a type of location path 504 and corresponding data or value 506. The type of location path 504 can be a particular location path 508 or ANY location path 510, which can include all the location paths in the XML path table 402. In one example specific to path index table 112 shown in FIG. 1, the location path 508 can be one of "/a/b", "/a/c", and "/a/id." In this example, ANY location path can include all of "/a/b", "/a/c", and "/a/id." The data 506 associated with location path "/a/b" can be "ABC" and "BCD." The data 506 associated with location path "/a/c" can be "ABC." The data 506 associated with location path "/a/id" can be "89011." The data 506 associated with ANY location path 510 can be "ABC", "BCD", and "89011."

FIG. 6 illustrates a location path and value pair 602 for a particular unique path identifier, and an initial version 604 of the path index table 112. The location path and value pair 602 can represent "/a/b" location path having "ABC" value, with a unique path identifier "89011." The computing server 104 can rearrange the data in the location path and value pair 602 to generate the initial version 604 of the path index table 112.

FIG. 7 illustrates a subsequent version 702 of path index data table 112. The computing server can further add the "BCD" data from the XML path table 402 to the location path "/a/b" in the version 604 of the path index table 112 to generate the subsequent version 702 of the path index data table 112. While this example is shown for location path "/a/b," the computing server 104 can further expand this version 702 of the path index data table 112 to another version of the path index data table 112 by adding other location paths (for example, "/a/c" and "/a/id") and corresponding data from the XML path table 402.

FIG. 8 illustrates a location path and value pair 802 for ANY location path 510 (that is, all location paths) and a subsequent version 804 of the path index table 112. The computing server 104 can generate the subsequent version 804 of the path index table 112 by adding the data in the location path and value pair 802 to the version 604 of the path index table 112. The location path and value pair 802 can have type of location path as ANY, value "ABC," and unique path identifier "89011."

FIG. 9 illustrates another subsequent version 902 of the path index table 112. The computing server 104 can generate the version 902 of the path index table 112 by adding the "BCD" data value to location paths "/a/b" 508 and ANY 510 in the version 804 of the path index table 112.

Figure 11:
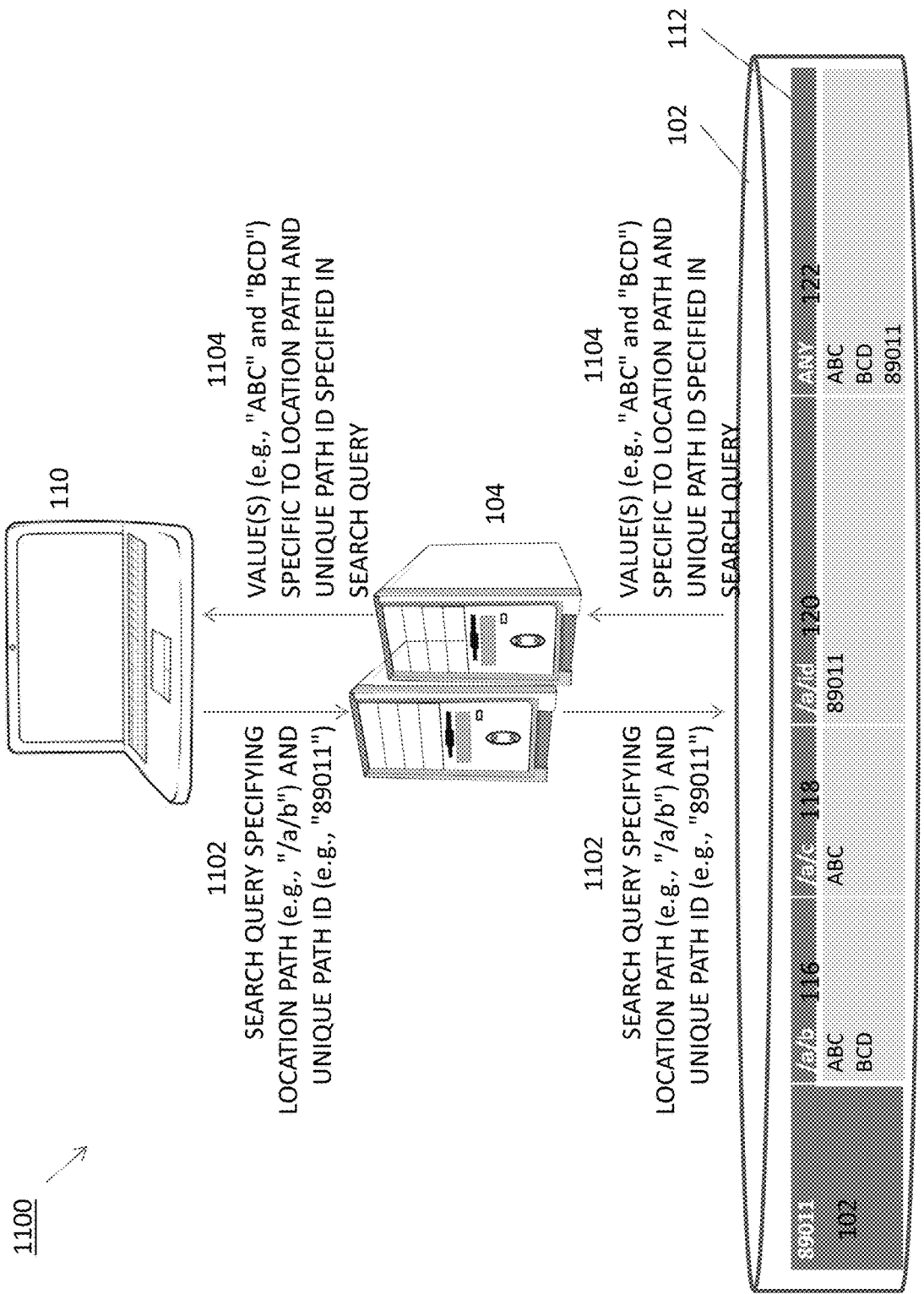
FIG. 11 illustrates a system for quickly searching XML data efficiently stored in the path index table in the data store when the search is performed based on unique path identifier and location path as inputs.
Figure 13:
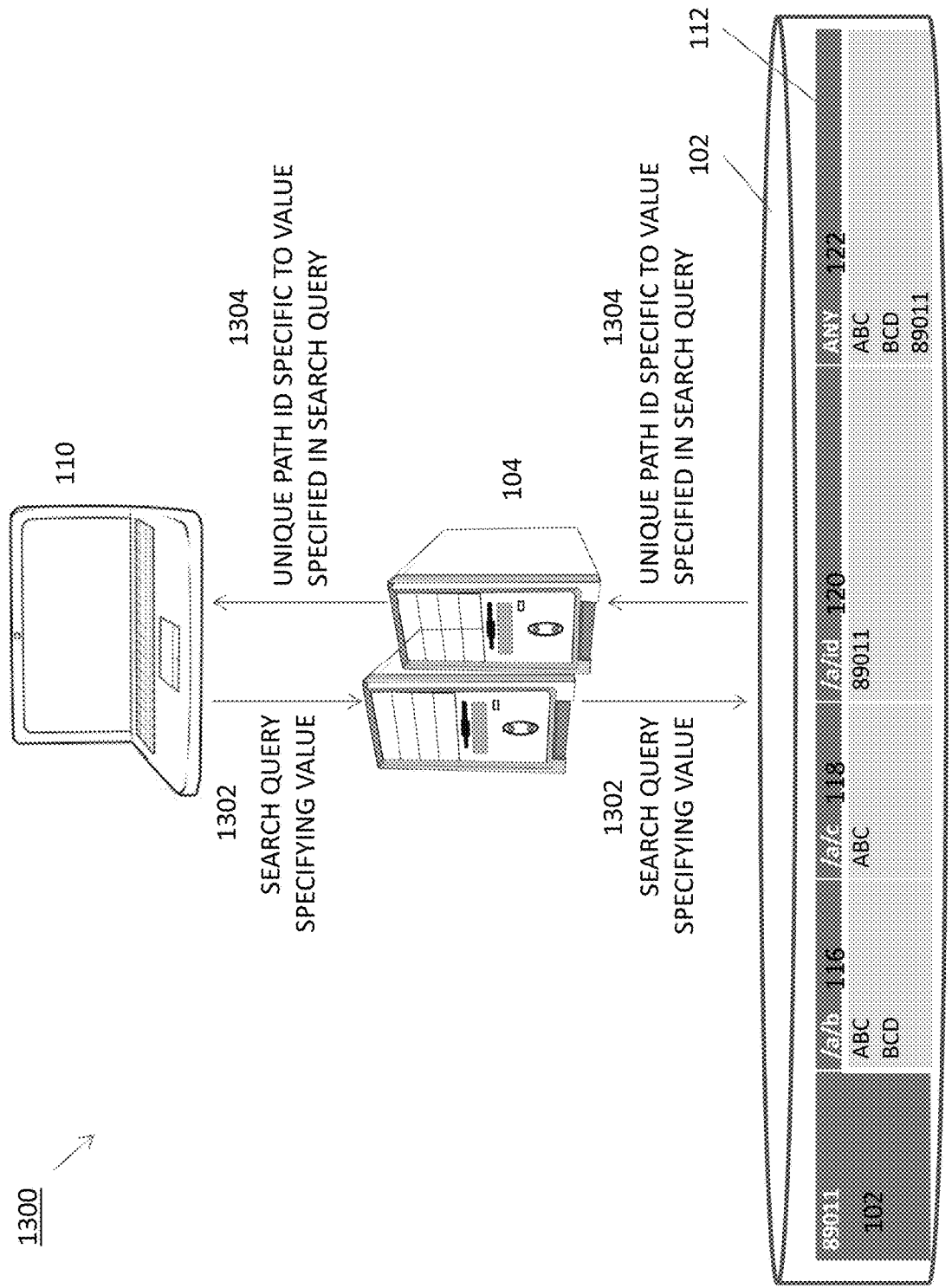
FIG. 13 illustrates a system for quickly searching a unique path identifier stored in the path index table in the data store when the search query specifies XML data.

FIG. 10 illustrates a final version 1002 of path index table 112. The final version 1002 is also shown in FIGS. 1, 11, and 13. The computing server 104 can generate the final version 1002 by adding all data values of all the location paths, including the ANY location path 510.

FIG. 11 illustrates a system 1100 for quickly searching XML data efficiently stored in the path index table 112 in the data store 102 when the search is performed based on unique path identifier 114 (for example, "89011") and location path (for example, "/a/b") as inputs. The computing server 104 can receive a search query 1102 including a location path (for example, "/a/b") and a unique path identifier (for example, "89011") 114 from a computing device 110. The computing server 104 can use the search query 110 to query the path index table 112 within the data store 102. If an entry associated with the received location path (for example, "/a/b") and unique path identifier (for example, "89011") exists in the path index table 112, the computing server 104 can retrieve the search result 1104 including one or more values (for example, "ABC" and "BCD") specific to the location path (for example, "/a/b") and unique path identifier (for example, "89011") from the data store 102. As the computing server has already arranged data in the path index table 112 in a search friendly manner, the time required to search for the search result 1104 can advantageously be minimal. The computing server 104 can then send this search result 1104 to the computing device 110, which can then display the search result on a graphical user interface executed by the computing device 110.

Figure 12:
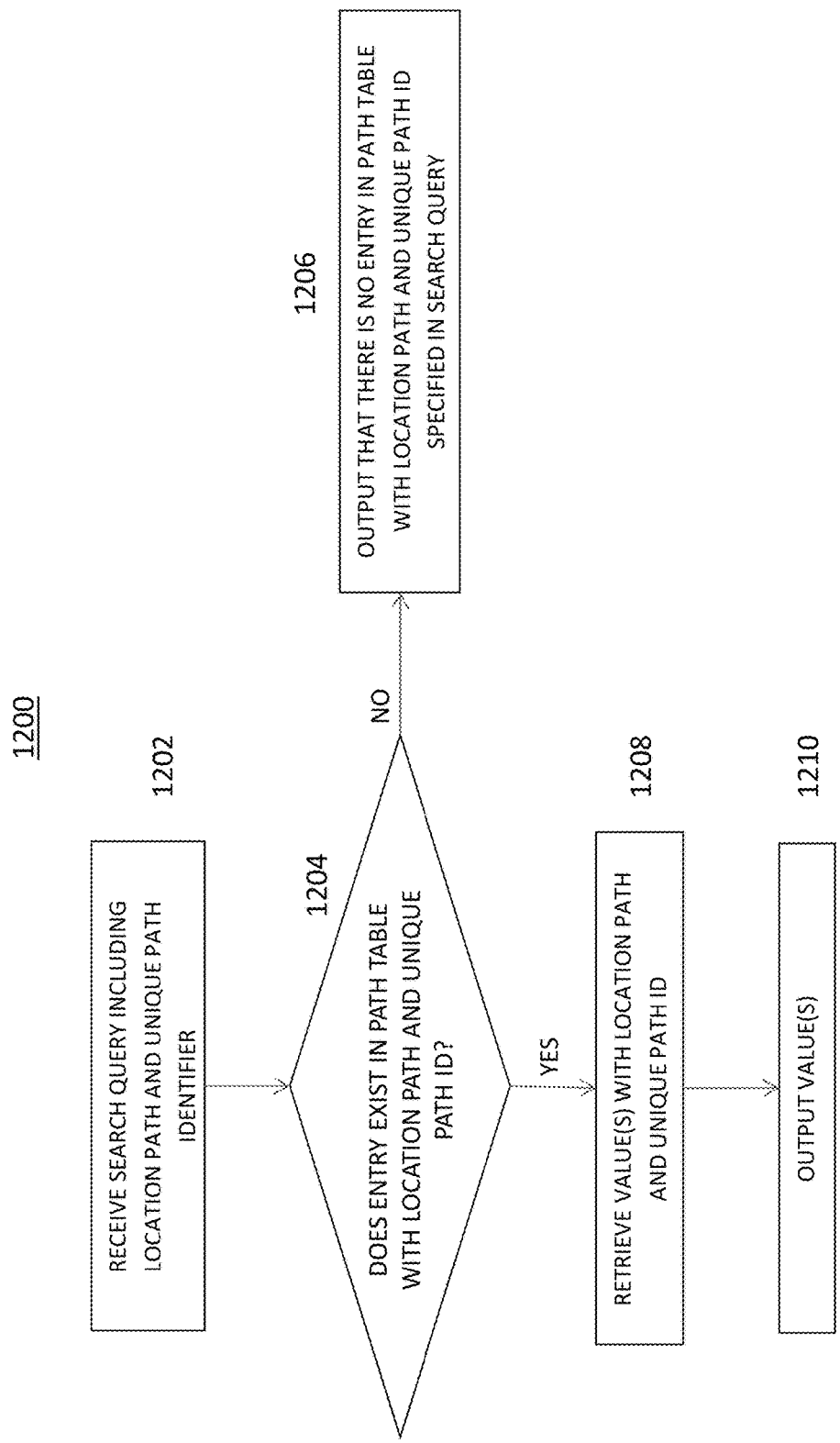
FIG. 12 illustrates a technical process for quickly searching XML data efficiently stored in the path index table in the data store when the search is performed based on unique path identifier and location path as inputs.

FIG. 12 illustrates a technical process 1200 for quickly searching XML data efficiently stored in the path index table 112 in the data store 102 when the search is performed based on unique path identifier 114 (for example, "89011") and location path (for example, "/a/b") as inputs. The computing server 104 can receive, at 1202, a search query 1104 including a location path and a unique path identifier 114 from a computing device 110. The computing server 104 can determine, at 1204, whether an entry associated with the received location path and unique path identifier exists in the path index table 112 within the data store 102. As the computing server 104 has already arranged data in the path index table 112 in a search friendly manner, the time required for the determining at 1204 can advantageously be minimal. If the computing server 104 determines at 1204 that there is no such entry, the computing server can output, at 1206, that there is no such entry in the path index table 112. If the computing server 104 determines at 1204 that such an entry exists, the computing server 104 can fetch or retrieve, at 1208, a search result 1104 including a list of values associated with location path and unique path identifier. The computing server 104 can then output, at 1210, the search result 1104. This outputting can include at least one of: (a) displaying the search result 1104 on a graphical user interface of the computing server 104, and (b) sending the search result 1104 via a communication network to the computing device 110, which can then display the search result 1104 on a graphical user interface executed by the computing device 110.

FIG. 13 illustrates a system 1300 for quickly searching a unique path identifier stored in the path index table 112 in the data store 102 when the search query specifies XML data (for example, "ABC" or "BCD") 1302. The computing server 104 can receive a search query 1302 including XML data or values (for example, "ABC" or "BCD") from a computing device 110. The computing server 104 can use the search query 1302 to query the path index table 112 within the data store 102. If an entry associated with the received XML data (for example, "ABC" or "BCD") exists in the path index table 112 within the data store 102, the computing server 104 can retrieve the search result including unique path identifier 1304 associated with the received XML data from the path index table 112. As the computing server 104 has already arranged data in the path index table 112 in a search friendly manner, the time required to search for the search result 1304 can advantageously be minimal. The computing server 104 can then send this search result 1304 to the computing device 110, which can then display the search result 1304 on a graphical user interface executed by the computing device 110.

Figure 14:
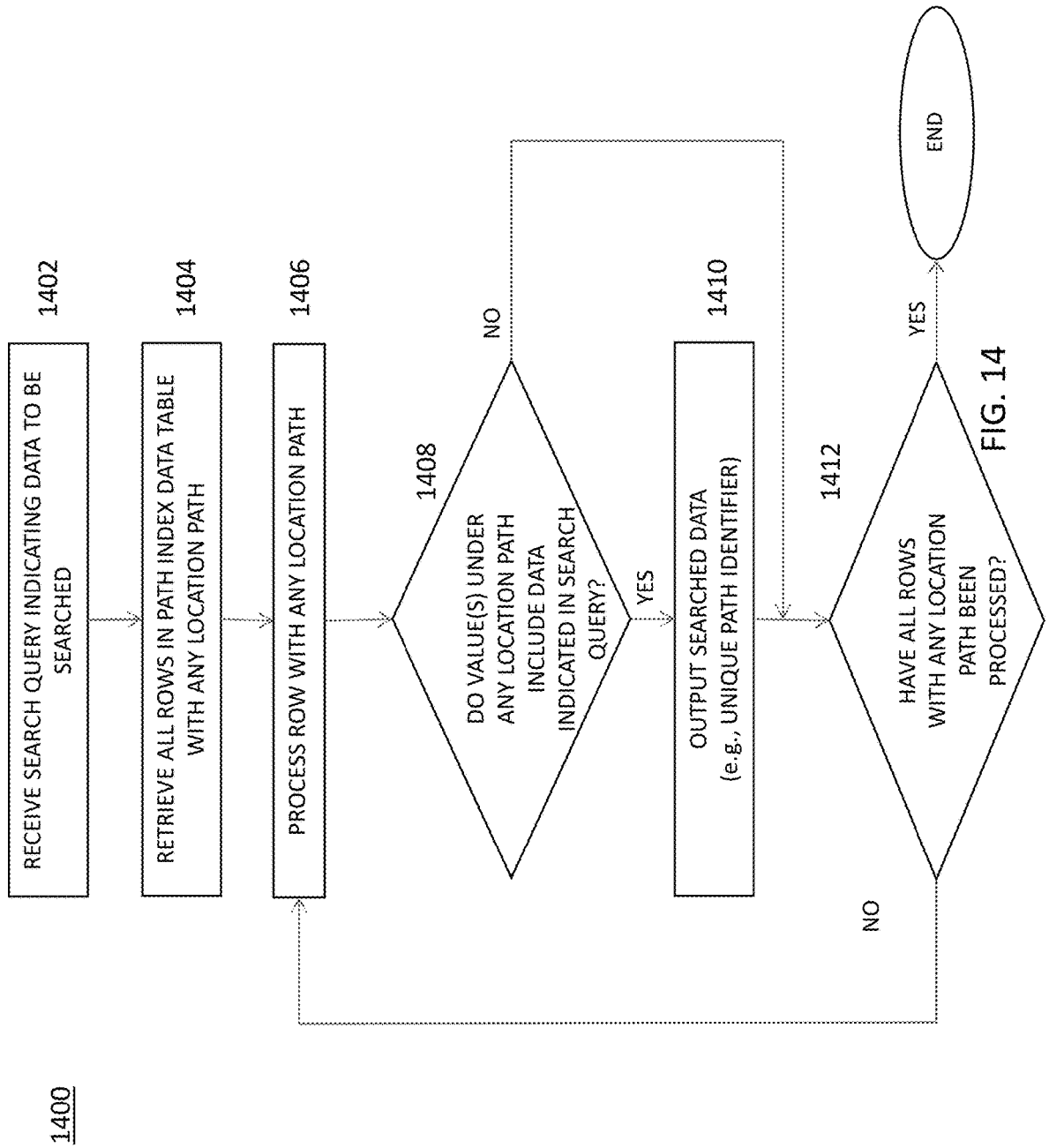
FIG. 14 illustrates a technical process for quickly searching a unique path identifier stored in the path index table in the data store when the search query specifies XML data.

FIG. 14 illustrates a technical process 1400 for quickly searching a unique path identifier stored in the path index table 112 in the data store 102 when the search query specifies XML data (for example, "ABC" or "BCD"). The computing server 104 can receive, at 1402 and from a computing device 110, a search query indicating data to be searched. In one example, this search query can be the search query 1302, which may indicate that the unique path identifier is to be searched. The computing server 104 can fetch or retrieve, at 1404, all rows in the path index table 112 with ANY location path. The computing server 104 can then determine, at 1406, whether the value in the first row having the ANY location path includes the data (for example, unique path identifier) specified in the search query. If the value in the first row having the ANY location path includes the data (for example, unique path identifier) specified in the search query, the computing server 104 can output, at 1410, the search result 1304 including the unique path identifier (for example, "89011"). This outputting at 1410 can include at least one of: (a) displaying the search result 1304 on a graphical user interface of the computing server 104, and (b) sending the search result 1304 via a communication network to the computing device 110, which can then display the search result 1304 on a graphical user interface executed by the computing device 110. The computing server 104 can then determine, at 1412, whether all rows with location path being ANY have been processed. If not, the computing server 104 can process each unprocessed row similar to the first row, as described above, until all the rows have been processed.

Various implementations of the subject matter described herein can be realized/implemented in digital electronic circuitry, integrated circuitry, specially designed application specific integrated circuits (ASICs), computer hardware, firmware, software, and/or combinations thereof. These various implementations can be implemented in one or more computer programs. These computer programs can be executable and/or interpreted on a programmable system. The programmable system can include at least one programmable processor, which can have a special purpose or a general purpose. The at least one programmable processor can be coupled to a storage system, at least one input device, and at least one output device. The at least one programmable processor can receive data and instructions from, and can transmit data and instructions to, the storage system, the at least one input device, and the at least one output device.

These computer programs (also known as programs, software, software applications or code) can include machine instructions for a programmable processor, and can be implemented in a high-level procedural and/or object-oriented programming language, and/or in assembly/machine language. As can be used herein, the term "machine-readable medium" can refer to any computer program product, apparatus and/or device (for example, magnetic discs, optical disks, memory, programmable logic devices (PLDs)) used to provide machine instructions and/or data to a programmable processor, including a machine-readable medium that can receive machine instructions as a machine-readable signal. The term "machine-readable signal" can refer to any signal used to provide machine instructions and/or data to a programmable processor.

To provide for interaction with a user, the subject matter described herein can be implemented on a computer that can display data to one or more users on a display device, such as a cathode ray tube (CRT) device, a liquid crystal display (LCD) monitor, a light emitting diode (LED) monitor, or any other display device. The computer can receive data from the one or more users via a keyboard, a mouse, a trackball, a joystick, or any other input device. To provide for interaction with the user, other devices can also be provided, such as devices operating based on user feedback, which can include sensory feedback, such as visual feedback, auditory feedback, tactile feedback, and any other feedback. The input from the user can be received in any form, such as acoustic input, speech input, tactile input, or any other input.

The subject matter described herein can be implemented in a computing system that can include at least one of a back-end component, a middleware component, a front-end component, and one or more combinations thereof. The back-end component can be a data server. The middleware component can be an application server. The front-end component can be a client computer having a graphical user interface or a web browser, through which a user can interact with an implementation of the subject matter described herein. The components of the system can be interconnected by any form or medium of digital data communication, such as a communication network. Examples of communication networks can include a local area network, a wide area network, internet, intranet, Bluetooth network, infrared network, or other networks.

The computing system can include clients and servers. A client and server can be generally remote from each other and can interact through a communication network. The relationship of client and server can arise by virtue of computer programs running on the respective computers and having a client-server relationship with each other.

Although a few variations have been described in detail above, other modifications can be possible. For example, the logic flows depicted in the accompanying figures and described herein do not require the particular order shown, or sequential order, to achieve desirable results. Other embodiments may be within the scope of the following claims.

What is claimed is:

1. A method comprising:
receiving, by a computing server comprising at least one programmable processor and from a computing device connected to the computing server, an extensible markup language document and a location path pointing to a unique path identifier uniquely identifying the extensible markup language document, the extensible markup language document and the location path being received separately, the extensible markup language document characterizing a tree having a root node and a plurality of child nodes;
generating, by the computing server, an in-memory first table that maps data within the extensible markup language document to one or more location paths, at least one location path of the one or more location paths being formed by combining the root node and a corresponding child node of the plurality of child nodes;
generating, by the computing server and by rearranging data within the in-memory first table, a second table comprising data arranged according to one or more location paths that are indicated by the extensible markup language document, the at least one location path of the one or more location paths pointing to a storage location for data listed under the location path in the table, the second table being specific to the unique path identifier, wherein generating the second table comprises:
retrieving the one or more location paths in the extensible markup language document and extensible markup language values associated with the possible location paths,
determining, by the computing server, the unique path identifier stored within the first table, and
serially processing, by the computing server, all entries in the first table, wherein the serially processing comprises:
receiving an entry from the first table, the entry comprising a location path and the unique path identifier,
determining that the entry does not exist in the second table,
creating, in response to the determining and from the first table, a location path and value pair for the unique path identifier, the location path and value pair comprising a location path and a corresponding value specific to the unique path identifier,
obtaining, in response to the determining indicating that the entry does exist in the second table, values associated with the location path and the unique path identifier,
determining, by the computer server, whether an entry exists in the first table having any location path of the one or more location paths and the unique path identifier,
creating, in response to determining the entry does not exist in the first table, a location path and value pair for the unique path identifier,
obtaining, in response to the determining indicating the entry does exist in the first table, a list of values associated with any location path of the one or more location paths and the unique path identifier,
determining, by the computer server, whether data stored in the in-memory data store exists in the obtained list of values,
adding, in response to the determining indicating the data does not exist in the obtained list of values, data indicated in a search query to the obtained list of values and
updating, in response to the adding, the obtained list of values associated with any location path of the one or more like location paths inside the second table, and
determining, by the computer server, whether all entries of the first table have been processed; and
storing, by the computing server and in response to determining that all entries of the first table have been processed, the second table in a data store connected to the computing server, the stored second table being searchable in a time that is independent of a total number of extensible markup language documents stored in the data store;
receiving, by the computing server and from the computing device, the search query, the search query including a specific location path of the one or more location paths and the unique path identifier;
searching, by the computing server, the second table in the data store for a data associated with the specific location path and the unique path identifier specified in the search query, the time taken to retrieve the searched data being independent of the total number of extensible markup language documents stored in the data store; and
sending, by the computing server, the searched data associated with the specific location path and the unique path identifier specified in the search query to the computing device.

2. The method of claim 1, wherein the table further comprises data arranged according to another location path that represents a combination of the one or more location paths that are generated using the extensible markup language document, the data arranged according to the another location path comprising data pointed to by each of the one or more location paths.

3. The method of claim 1, wherein the computing device is configured to display the searched data on a graphical user interface.

4. The method of claim 1, wherein:
the receiving of the extensible markup language document and the location path, the generating of the table, and the storing of the table occur in design-time; and
the receiving of the search query, the searching of the table, and the sending of the searched data occur in real-time.

5. The method of claim 1, further comprising:
receiving, by the computing server and from the computing device, a search query including data stored in the table in the data store;
searching, by the computing server, the table in the data store for the identifier associated with the data stored in the table in the data store; and
sending, by the computing server, the identifier to the computing device.

6. The method of claim 5, wherein the computing device is configured to display the searched identifier on a graphical user interface.

7. The method of claim 5, wherein:
the receiving of the extensible markup language document and the location path, the generating of the table, and the storing of the table occur in design-time; and
the receiving of the search query, the searching of the table, and the sending of the searched data occur in real-time.

8. The method of claim 1, wherein the computing device is connected to the computing server via a communication network.

9. The method of claim 1, wherein:
the data store is connected to the computing server via a communication network; and
the data store is a key value data store comprising one or more keys and one or more values associated with the one or more keys, the one or more keys being the one or more location paths, the one or more values being the data listed under the one or more location paths.

10. A system comprising:
a computing device having an extensible markup language document and a location path pointing to a unique path identifier uniquely identifying the extensible markup language document;
a computing server operatively coupled to the computing device, the computing server comprising at least one programmable processor configured to:
separately receive the extensible markup language document and the location path from the computing device,
generate, by rearranging data within the extensible markup language document, a second table comprising data arranged according to one or more location paths that are indicated by the extensible markup language document, each location path of the one or more location paths pointing to a storage location for data listed under the location path, the second table being specific to the unique path identifier, wherein generating the second table comprises:
retrieving the one or more location paths in the extensible markup language document and all extensible markup language values associated with the possible location paths,
determining, by the computing server, the unique path identifier stored within the first table, and
serially processing, by the computing server, all entries in the first table, wherein the serially processing comprises:
receiving an entry from the first table, the entry comprising a location path and the unique path identifier,
creating, in response to the receiving and from the first table, a location path and value pair for the unique path identifier, the location path and value pair comprising a location path and a corresponding value specific to the unique path identifier,
obtaining, in response to the creating, values associated with the location path and the unique path identifier,
creating, in response to determining the entry does not exist in the first table, a location path and value pair for the unique path identifier,
obtaining, in response to an indication the entry does exist in the first table, a list of values associated with any location path of the one or more location paths and the unique path identifier,
adding, in response to an indication the entry does not exist in the obtained list of values, data indicated in a search query to the obtained list of values and
updating, in response to the adding, the obtained list of values associated with any location path of the one or more like location paths inside the second table, and
determining, by the computer server, whether all entries of the first table have been processed; and
store, by the computing server and in response to determining that all entries of the first table have been processed, the second table in a data store connected to the computing server, the stored second table being searchable in a time that is independent of a total number of extensible markup language documents stored in the data store;
receiving, by the computing server and from the computing device, the search query, the search query including a specific location path of the one or more location paths and the unique path identifier;
searching, by the computing server, the second table in the data store for a data associated with the specific location path and the unique path identifier specified in the search query, the time taken to retrieve the searched data being independent of the total number of extensible markup language documents stored in the data store; and
sending, by the computing server, the searched data associated with the specific location path and the unique path identifier specified in the search query to the computing device.

11. The system of claim 10, wherein the computing device executes a graphical user interface configured to display the searched data.

12. The system of claim 10, wherein:
the receiving of the extensible markup language document and the location path, the generating of the table, and the storing of the table occur in design-time; and
the receiving of the search query, the searching of the table, and the sending of the searched data occur in real-time.

13. The system of claim 10, wherein the computing server is further configured to:
receive, from the computing device, a search query including data stored in the table in the key value data store;
search the table in the key value data store for the identifier associated with the data stored in the table in the key value data store; and
send the identifier to the computing device.

14. The system of claim 13, wherein the computing device includes a user interface device that is configured to display the searched identifier.

15. The system of claim 13, wherein:
the receiving of the extensible markup language document and the location path, the generating of the table, and the storing of the table occur in design-time; and
the receiving of the search query, the searching of the table, and the sending of the searched data occur in real-time.

16. The system of claim 10, wherein the computing device is operatively coupled to the computing server via a communication network.

17. The system of claim 10, wherein the key value data store is operatively coupled to the computing server via a communication network.

18. The system of claim 10, wherein generating the second table further comprises:
determining by the computer server, that the entry from the first table does not exist in the second table,
determining, by the computer server, whether an entry exists in the first table having any location path of the one or more location paths and the unique path identifier, and
determining, by the computer server, whether data stored in the in-memory data store exists in the obtained list of values.

19. A non-transitory computer program product storing instructions that, when executed by at least one programmable processor, cause the at least one programmable processor to perform operations comprising:
receiving an extensible markup language document and a location path pointing to a unique path identifier uniquely identifying the extensible markup language document, the location path being external to the extensible markup language document during the receiving of the extensible markup language document and the location path, the extensible markup language document characterizing a tree having a root node and a plurality of child nodes;
generating an in-memory first table that maps data within the extensible markup language document to one or more location paths, each location path of the one or more location paths being formed by combining the root node and a corresponding child node of the plurality of child nodes, each location path of the one or more location paths pointing to a storage location for data listed under the location path;
generating, by modifying at least one of order and position of data within the in-memory first table, a second table comprising data arranged according to one or more location paths that are indicated by the extensible markup language document, the second table being specific to the unique path identifier, wherein generating the second table comprises:
retrieving the one or more location paths in the extensible markup language document and all extensible markup language values associated with the possible location paths,
determining, by the computer server, the unique path identifier stored within the first table, and
serially processing, by the computer server, all entries in the first table, wherein the serially processing comprises:
receiving an entry from the first table, the entry comprising a location path and the unique path identifier,
determining that the entry does not exist in the second table,
creating, in response to the determining and from the first table, a location path and value pair for the unique path identifier, the location path and value pair comprising a location path and a corresponding value specific to the unique path identifier,
obtaining, in response to the determining indicating that the entry does exist in the second table, values associated with the location path and the unique path identifier,
determining, by the computer server, whether an entry exists in the first table having any location path of the one or more location paths and the unique path identifier,
creating, in response to determining the entry does not exist in the first table, a location path and value pair for the unique path identifier,
obtaining, in response to the determining indicating the entry does exist in the first table, a list of values associated with any location path of the one or more location paths and the unique path identifier,
determining, by the computer server, whether data stored in the in-memory data store exists in the obtained list of values,
adding, in response to the determining indicating the data does not exist in the obtained list of values, data indicated in a search query to the obtained list of values and
updating, in response to the adding, the obtained list of values associated with any location path of the one or more like location paths inside the second table, and
determining, by the computer server, whether all entries of the first table have been processed; and
storing, by the computing server and in response to determining that all entries of the first table have been processed, the second table in a data store connected to the computing server, the stored second table being searchable in a time that is independent of a total number of extensible markup language documents stored in the data store;
receiving, by the computing server and from the computing device, the search query, the search query including a specific location path of the one or more location paths and the unique path identifier;
searching, by the computing server, the second table in the data store for a data associated with the specific location path and the unique path identifier specified in the search query, the time taken to retrieve the searched data being independent of the total number of extensible markup language documents stored in the data store; and
sending, by the computing server, the searched data associated with the specific location path and the unique path identifier specified in the search query to the computing device.

20. The non-transitory computer program product of claim 19, wherein the operations further comprise:
receiving a second search query including data stored in the table in the key value data store;
searching the table in the key value data store for the identifier associated with the data stored in the table in the key value data store; and
sending the identifier.

\* \* \* \* \*